No. 747,661. Patented December 22, 1903.

UNITED STATES PATENT OFFICE.

BENJAMIN TALBOT, OF PENCOYD, PENNSYLVANIA.

MANUFACTURE OF OPEN-HEARTH STEEL.

SPECIFICATION forming part of Letters Patent No. 747,661, dated December 22, 1903.

Application filed December 14, 1900. Serial No. 39,905. (No specimens.)

*To all whom it may concern:*

Be it known that I, BENJAMIN TALBOT, a resident of Pencoyd, in the county of Montgomery and State of Pennsylvania, have invented certain new and useful Improvements in the Manufacture of Open-Hearth Steel, of which the following is a specification.

This invention relates to the manufacture of open-hearth steel; and its chief objects are to facilitate the reduction of metal from their oxids and the removal of the metalloids from metal being converted into steel.

In the manufacture of steel by the basic open-hearth process pig-iron is treated in a furnace with iron oxid and lime, and in the reactions which take place the metalloids, silicon, phosphorus, and carbon contained in the pig-iron combine with the oxygen of the iron oxid, which may be ore, scale, or cinder. Metallic iron is thus precipitated from the iron oxid and becomes incorporated with the body of metal in the furnace, while the oxidized metalloids pass into the slag formed or escape as gas.

I have found that the direct reduction of iron from its oxids, as also the reduction of manganese and nickel from their oxids, and the elimination of the metalloids contained in iron or unrefined steel are facilitated by employing carbon with oxid of iron, as also with oxid of manganese and nickel, in the following manner: A basic open-hearth furnace, preferably of large capacity, is provided with a charge of iron or steel preferably constituting about half its capacity. This metal is treated with iron oxid and lime or limestone in the manner usually employed in open-hearth practice, and a covering of slag is formed upon the bath thereby. Then a mixture of carbon and oxid of iron and also oxid of nickel or oxid of manganese when desired is charged into the furnace in such quantities as will be absorbed by the furnace contents without greatly cooling the bath or checking the furnace action. Lime or limestone is also added in such quantities and as required for producing the degree of basicity necessary for holding the metalloids reduced and absorbed by the slag. To such a charge of metal thus provided with a covering of basic slag there is added molten pig-iron or unrefined steel, (which may be taken from a blast-furnace, cupola, mixer, or Bessemer converter,) from which the metalloids are reduced by coming into contact with the basic slag, and metallic iron, as well as nickel or manganese, if contained in the slag, is reduced from the oxids in large amounts and becomes incorporated with the body of metal in the furnace. Part of the impure slag resulting from these operations may be run off as it accumulates at any time desired. As the furnace charge becomes refined to the extent desired metal is tapped off. By preference a portion only of the refined metal is withdrawn, and the operations described are repeated, the process being preferably carried on continuously.

The operation of refining may be wholly completed in one furnace, or partially-refined metal may be tapped from a primary furnace and carried to a finishing furnace or furnaces, where the operation of refining may be completed either by the use of carbon and oxid in the manner and for the purpose hereinbefore described by dilution with steel scrap or in any manner suitable for further refining the metal.

The metal to be treated may be high in phosphorus, as the process is well adapted for treating high-phosphorus irons.

It will be understood that the order of charging lime, unrefined metal, carbon, and metallic oxids, as well as of drawing off refined metal and exhausted slag, may be varied as required by existing conditions.

In adding carbon to the furnace charge with the metallic oxids and lime the immediate combustion of the carbon reinforces the temperature of the furnace and counteracts the tendency to check the heating operation due to the addition of the cold oxids and lime. The addition of the oxids of nickel and manganese not only provides oxygen for the reduction of the metalloids contained in the iron, but the metallic nickel and manganese released by the reaction become incorporated with the bath, by which a manganese steel or nickel product is produced.

It is not intended that the process shall be limited to the reduction of pig-iron to steel in one operation or in a single furnace, as the sequence of steps described may be employed for partially removing the metalloids or partially purifying the metal in a primary furnace, and therefrom the partially-refined metal may be charged into a secondary furnace or furnaces for completion into steel by a repetition of the same sequence of steps or subjected to other treatment.

Having thus described my invention, I claim—

1. In the manufacture of open-hearth steel, the process which consists in providing a furnace with a bath of refined or partially-refined iron or steel having a covering of basic slag, adding carbon and metallic oxid thereto, adding molten iron or steel containing metalloids thereto, and withdrawing metal from the furnace when refined to the extent required, substantially as specified.

2. In the manufacture of open-hearth steel, the process which consists in providing a furnace with a bath of refined or partially-refined iron or steel having a covering of basic slag, adding carbon and metallic oxid and lime thereto, adding molten iron or steel containing metalloids thereto, withdrawing a portion of the furnace contents and adding further metallic oxid and iron or steel, substantially as specified.

3. In the manufacture of open-hearth steel, the process which consists in providing a furnace with a bath of refined or partially-refined iron or steel having a covering of basic slag, adding carbon and iron oxid, adding metal containing phosphorus thereto, withdrawing slag therefrom, and withdrawing a portion of the metal when refined to the desired degree, substantially as specified.

4. In the manufacture of open-hearth steel, the process which consists in charging a furnace with iron or steel, lime, iron oxid and carbon, adding iron or steel containing metalloids thereto, and withdrawing metal from the furnace when the reductions have been carried to the desired degree, substantially as specified.

5. In the manufacture of open-hearth steel, the process which consists in charging a furnace with iron or steel, lime, iron oxid and carbon, adding iron or steel containing metalloids thereto, withdrawing slag therefrom, and withdrawing metal from the furnace when the reductions have been carried to the desired degree, substantially as specified.

6. In the manufacture of open-hearth steel, the process which consists in providing a furnace with a bath of iron or steel having a covering of slag containing lime, metallic oxid and carbon, adding molten iron or steel containing metalloids thereto, and withdrawing slag and metal from the furnace when the metalloids and the metallic oxids have been reduced to the extent desired, substantially as specified.

7. In the manufacture of open-hearth steel, the process which consists in providing a furnace with a bath of iron or steel having a covering of slag containing lime, carbon and metallic oxid, adding molten iron or steel containing metalloids thereto, withdrawing portions of the slag and the metal from the furnace as the metalloids and the metallic oxid are reduced to the desired degrees, and adding further lime, carbon, metallic oxid and iron or steel containing metalloids to the charge remaining in the furnace, substantially as specified.

8. In the manufacture of open-hearth steel the process which consists in providing a furnace with a charge of molten iron or steel and lime, carbon, and metallic oxid, adding molten iron or steel containing phosphorus thereto, withdrawing portions of the slag formed and the metal purified thereby, adding further lime, carbon, metallic oxid and molten iron or steel containing phosphorus thereto, and continuing said operations, substantially as specified.

In testimony whereof I have hereunto set my hand, this 13th day of December, 1900, in the presence of the subscribing witnesses.

BENJAMIN TALBOT.

Witnesses:
JOHN THIEL,
PERCIVAL H. GRANGER.